United States Patent
Erixon et al.

(10) Patent No.: US 8,018,105 B2
(45) Date of Patent: Sep. 13, 2011

(54) VIBRATOR TUBE

(75) Inventors: Mats Erixon, Bjarred (SE); Mats Wolf, Sodra Sandby (SE); Stefan Hellstrom, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 234 days.

(21) Appl. No.: 11/909,199

(22) PCT Filed: Mar. 15, 2006

(86) PCT No.: PCT/EP2006/002364
§ 371 (c)(1),
(2), (4) Date: Sep. 20, 2007

(87) PCT Pub. No.: WO2006/099979
PCT Pub. Date: Sep. 28, 2006

(65) Prior Publication Data
US 2008/0174187 A1     Jul. 24, 2008

Related U.S. Application Data

(60) Provisional application No. 60/666,234, filed on Mar. 29, 2005.

(30) Foreign Application Priority Data

Mar. 21, 2005   (EP) ..................................... 05006110

(51) Int. Cl.
*H02K 33/00*   (2006.01)
(52) U.S. Cl. ....................................... 310/81; 310/12.31

(58) Field of Classification Search .............. 310/12–15, 310/81
See application file for complete search history.

(56) References Cited

U.S. PATENT DOCUMENTS

| 3,984,708 | A |   | 10/1976 | Holmlund et al. |
| 5,973,422 | A | * | 10/1999 | Clamme .......................... 310/36 |
| 6,326,706 | B1 | * | 12/2001 | Zhang .............................. 310/12 |
| 6,636,007 | B2 | * | 10/2003 | Hong et al. ................... 318/114 |
| 7,288,860 | B2 | * | 10/2007 | Cheung et al. ................. 310/12 |
| 7,449,803 | B2 | * | 11/2008 | Sahyoun .......................... 310/14 |
| 2003/0114999 | A1 |   | 6/2003 | Shimoda et al. |
| 2003/0155827 | A1 |   | 8/2003 | Cheung et al. |

FOREIGN PATENT DOCUMENTS

| CN |       1486528 A | 3/2004 |
| JP |     2004/174309 A | 6/2004 |
| WO | WO 2004/114723 A | 6/2004 |

OTHER PUBLICATIONS

International Search Report dated May 11, 2006, 3 pages.

* cited by examiner

*Primary Examiner* — Dang D Le
(74) *Attorney, Agent, or Firm* — Harrity & Harrity, LLP

(57) ABSTRACT

An electromagnetic vibrator for use in a portable communication device includes a housing including a track directed in a first dimension; a coiling including at least one coil turn, oriented in a second dimension essentially perpendicular to the first dimension, coiled around the track and being arranged to receive an electric voltage; a permanent magnet assembly arranged for motion along the track to which the permanent magnet assembly is tightly fitted; and a ferrofluid mixture placed between the track and the permanent magnet assembly allowing motion of the permanent magnet assembly in the first dimension in dependence of the electric voltage as supplied to the coiling.

17 Claims, 2 Drawing Sheets

VIBRATOR TUBE

RELATED APPLICATIONS

This application is the national phase under 35 U.S.C. §371 of PCT International Application No. PCT/EP2006/002364 which has an International filing date of Mar. 15, 2006, and which designated the United States of America and which claims priority of European Patent Application Number 05006110.0, filed Mar. 21, 2005, and also claims priority under 35 U.S.C. §119 of U.S. Provisional Application Ser. No. 60/666,234, filed Mar. 29, 2005, each of which is incorporated herein by reference.

FIELD OF THE INVENTION

The present invention relates to providing tactile stimuli to a user of a portable communication device.

DESCRIPTION OF RELATED ART

Vibrators within small communication devices are most commonly designed as direct current (DC) motors where a counter weight is mounted off-center on the rotating axis. Upon rotation of the axis, the counter weight causes the vibrator to vibrate as a function of the rotational frequency.

There is also another type of vibrators, linear motor type vibrators, which comprise a magnet and a coil system that are driven by an alternating current (AC) electric source. Linear motor type vibrators typically have a metal spring attached to a top or a bottom of a housing in order to provide support to the magnet system. One example of such a linear vibrator is described in JP2004-174309.

Until today the best performance has been achieved by the DC-motor type vibrators. However, there are disadvantages with this type of vibrators. The first disadvantage is that the response time is too long to enable a quick vibration response required in, for example, gaming. A second disadvantage is that the counter weight is not protected against dust and mechanical damage to the same degree as the interior of the motor itself.

A drawback of the linear motor type vibrator is that the efficiency in terms of vibration is only about 25-50% of that of a DC-motor type vibrator.

The american patent document U.S. Pat. No. 6,768,230 discloses a device for electrical generation comprising multiple magnets in polar opposition to each other, arranged horizontally respecting a very critical angle of displacement, to induce an electrical signal in one or more surrounding coils. Moreover a lubricant, preferably being a ferrofluid, that establishes a static coefficient of friction less than about 0.02. This document hence describes a horizontally restricted electrical generation device, a narrow application, wherein a ferrofluid is being used.

There is hence still a need to overcome the deficiencies of the vibrators as presented above, to achieve an efficient vibrator, having a short response time without comprising any mechanical parts that can be damaged from outside influences.

SUMMARY OF THE INVENTION

The invention is directed towards solving the problem of overcoming slow and inefficient provision of tactile stimuli to a user of a portable communication device.

This is achieved by providing quick and efficient vibrations of a portable communication device.

A first object of the present invention is to provide a device for providing quick and efficient vibrations of a portable communication device.

According to one aspect of this invention, this object is achieved by an electromagnetic vibrator for use in a portable communication device comprising:

a housing comprising a track directed in a first dimension,
a coiling comprising at least one coil turn, oriented in a second dimension essentially perpendicular to the first dimension, coiled around the track and being arranged to receive an electric voltage,
a permanent magnet assembly arranged for motion along the track to which said permanent magnet assembly is tightly fitted, and
a ferrofluid mixture placed between the track and the permanent magnet assembly,
allowing motion of the permanent magnet assembly in the first dimension in dependence of the electric voltage as supplied to the coiling.

A second aspect of the present invention is directed towards an electromagnetic vibrator including the features of the first aspect, wherein the ferrofluid is a low friction ferrofluid mixture comprising magnetic or magnetizable nano particles, and a carrier fluid, in which the magnetic or magnetizable nano particles are dispersed.

A third aspect of the present invention is directed towards an electromagnetic vibrator including the features of the second aspect, wherein the nano particles comprise ferrite particles and the carrier fluid comprises an organic carrier fluid.

A fourth aspect of the present invention is directed towards an electromagnetic vibrator including the features of the first aspect, wherein the track comprises a tubular cavity directed in the first dimension and in which tubular cavity the first permanent magnet assembly is arranged to move.

A fifth aspect of the present invention is directed towards an electromagnetic vibrator including the features of the fourth aspect, wherein the tubular cavity has a circular cross section.

A sixth aspect of the present invention is directed towards an electromagnetic vibrator including the features of the fourth aspect, wherein the tubular cavity is linear in shape.

A seventh aspect of the present invention is directed towards an electromagnetic vibrator including the features of the fifth aspect, wherein the vibrator comprises at least a first centering element located on a first side of the permanent magnet assembly along the first dimension, for exerting an alternating attracting and repelling force directed in the first dimension on the permanent magnet assembly.

An eighth aspect of the present invention is directed towards an electromagnetic vibrator including the features of the seventh aspect, wherein the vibrator comprises a second centering element located on a second side of the permanent magnet assembly along the first dimensions for exerting a centering force directed in the first dimension on the permanent magnet assembly.

A ninth aspect of the present invention is directed towards an electromagnetic vibrator including the features of the seventh aspect, wherein the first centering element comprises a first spring of which a first end is attached to a first end of the permanent magnet assembly, and of which a second end is attached to an inner side of a first end stop of the tubular cavity.

A tenth aspect of the present invention is directed towards an electromagnetic vibrator including the features of the eighth aspect, wherein the first and second centering elements comprise a first and a second spring, respectively, attached on either side of the permanent magnet assembly, for exerting centering forces directed in the first dimension on the permanent magnet assembly.

An eleventh aspect of the present invention is directed towards an electromagnetic vibrator including the features of the ninth aspect, wherein the first and second springs are non-linear in the first dimension.

A twelfth aspect of the present invention is directed towards an electromagnetic vibrator including the features of the eighth aspect, wherein the first and second centering elements comprise a second and a third permanent magnet, respectively, oriented in opposite direction in relation to one another in the first dimension, for exerting centering forces directed in the first dimension on the permanent magnet assembly.

A thirteenth aspect of the present invention is directed towards an electromagnetic vibrator including the features of the eighth aspect, wherein the first and second centering elements each comprise an essentially gas tight compartment and wherein there is an essentially gas tight fit at the contact surface between the permanent magnet assembly and the surface wall of the tubular cavity.

A fourteenth aspect of the present invention is directed towards an electromagnetic vibrator including the features of the first aspect, wherein the coiling is arranged to receive an alternating current electric voltage.

A fifteenth aspect of the present invention is directed towards an electromagnetic vibrator including the features of the first aspect, wherein the tubular cavity has a toroidal shape.

A sixteenth aspect of the present invention is directed towards an electromagnetic vibrator including the features of the fifteenth aspect, wherein the coiling is arranged to receive a direct current electric voltage.

A second object of the present invention is to provide a portable communication device providing quick and efficient vibrations to its user.

A seventeenth aspect of the present invention is to provide a portable communication device comprising an electromagnetic vibrator comprising:
a housing comprising a track directed in a first dimension,
a coiling comprising at least one coil turn, oriented in a second dimension essentially perpendicular to the first dimension, around the track and being arranged to receive an electric voltage,
a permanent magnet assembly arranged for motion along the track, and
a ferrofluid mixture placed between the track and the permanent magnet assembly,
allowing motion of the permanent magnet assembly in the first dimension in dependence of the electric voltage as supplied to the coiling, and wherein the portable communication device is a mobile phone.

The present invention has thus the following overall advantages:

Firstly, the electromagnetic vibrator is more efficient due to the application of a ferrofluid mixture subjected to a magnetic field.

Secondly, the electromagnetic vibrator also achieves a shorter response time as the friction between the magnet assembly and the housing or track, is minimized.

Thirdly, the electromagnetic vibrator is also void of any mechanical parts that can be damaged from outside influences.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

The invention is directed towards solving the problem of overcoming slow and inefficient provision of tactile stimuli to a user of a portable communication device.

Electromagnetic vibrators utilizes the influence on a magnet by a magnetic field, which field generally is created by letting an electric current flow through a coiling. Dependent on the design of such magnet-coil system either a direct current (DC) electric voltage or an alternating current (AC) electric voltage is supplied to the coil, enabling an AC electric current and a DC electric current to flow through the coil.

Figure 1:
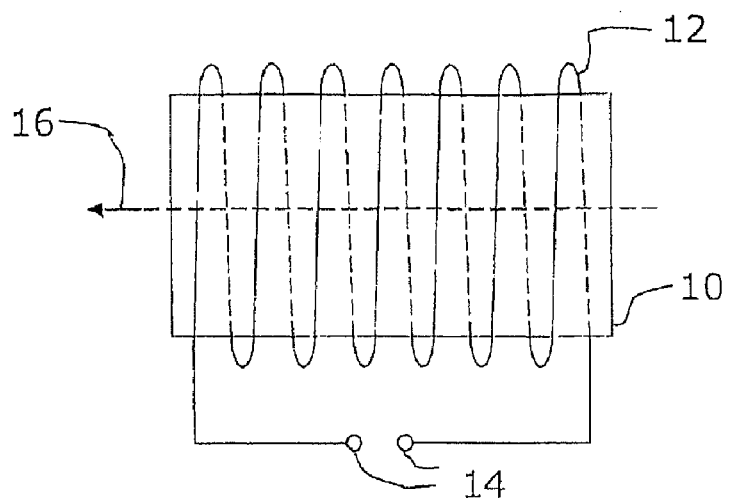
FIG. 1 schematically shows a housing-coil system.

FIG. 1 schematically shows an elongated hollow housing 10 around which a coiling is wound. An electric voltage is applied to the connections 14, creating a magnetic field 16 that is directed along the long axis of the housing. The direction of the magnetic field is dependent on the polarity of the applied electric voltage.

Figure 2:
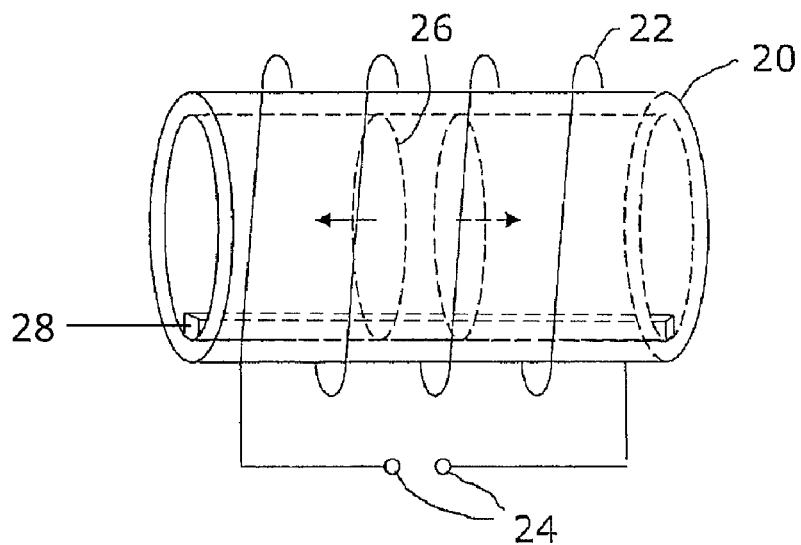
FIG. 2 schematically shows housing-coil-magnet system according to one embodiment of the present invention, FIG. 3 schematically shows a more detailed housing-magnet arrangement according to one embodiment of the present invention, FIG. 4 schematically shows a housing-magnet arrangement according to one embodiment of the present invention, FIG. 5 schematically shows a housing-magnet arrangement according to one embodiment of the present invention, FIG. 6 schematically shows a housing-magnet arrangement according to one embodiment of the present invention, FIG. 7 schematically shows a housing-magnet arrangement according to one embodiment of the present invention, FIG. 8 schematically shows a housing-coil-magnet arrangement according to one embodiment of the present invention, and FIG. 9 schematically shows a portable communication device according to one embodiment of the present invention.

As is shown in FIG. 2 a housing is designed to have a circular cross section, forming a hollow straight cylinder. A coiling 22 is would around the circular housing, which coiling is supplied with an electric voltage over the connectors 24. A magnet 26 is positioned within the housing 20. On supplying an electric voltage over the coiling 22 at the connectors 24, a magnetic field is created within and around the coiling 22. The magnet 26 is preferably oriented so that the magnetic axis of the magnet is parallel with the symmetry axis of the cylindrical housing, and most preferably that the directions of the magnetic axis and the center of the magnetic field, created by the coiling, coincide.

The two magnetic fields, that is the magnetic field as created by the electric current flowing through the coiling and the one as formed by the magnet, interact with each other and create relative attracting or repelling forces, dependent on the relative position of the magnet and the coiling within the housing, and the current that is fed through the coiling.

According to one embodiment of the present invention, the housing has a linear shape, as shown in FIG. 2, which means that the magnet can be made to move back and fourth within the linear housing, by applying the electrical voltage over the connectors 24 of the coiling.

According to one embodiment of the present invention the track is a tubular cavity. The cross section of the tubular cavity may also be circular. According to another embodiment of the present invention, it may also have any other shape such as rectangular or triangular shape or a non-polynomial shape such a horse-shoe shape or any other shape.

According to one embodiment the track is a rail 28 that is protruding from a surface within the housing. According to this embodiment the magnet or magnet assembly, as we shall see below, is fitted around or on the track such that the magnet or magnet assembly is guided by the track along the housing upon influence of the magnetic field generated around the coiling.

Alternatively, the track may also be a trace that is recessing from the surface within the housing, according to another embodiment of the present invention. Here, the magnet or magnet assembly may comprise a rail 28 that is arranged to fit into the trace recessing from the housing surface. The housing surface may not necessarily be an interior surface located within the housing, but may very well be an exterior surface of housing having a cross section that is non-closed. One example of such a shape is the horse-shoe shaped housing as mentioned above.

Figure 3:
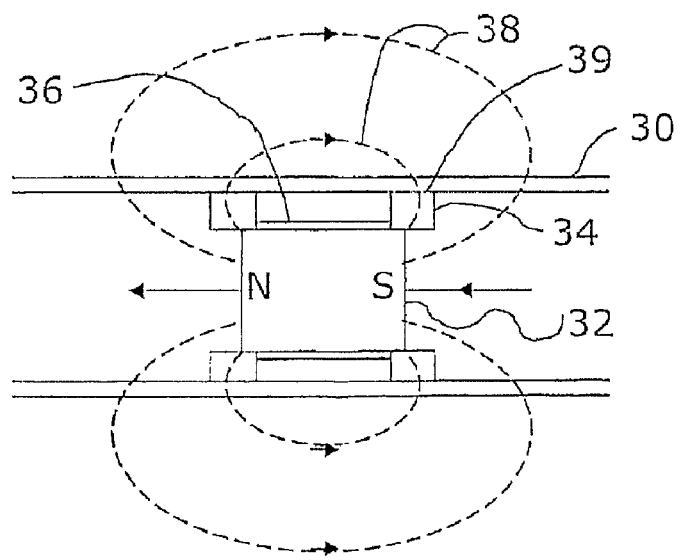

With reference to FIG. 3, schematically showing a more detailed housing-magnet arrangement according to one embodiment of the present invention, the present invention is further explained.

The electromagnetic vibrator according to the present invention comprises the inclusion of a ferrofluid located in an interface between the magnet or magnet assembly and a track along which the magnet can be made to move.

In FIG. 3, the electromagnetic vibrator, as schematically disclosed, comprises a linear housing 30, a permanent magnet 32 and a magnet support 34, 36. The magnet 32 and the magnet support 34,36 together form the magnet assembly.

According to this embodiment of the present invention, the magnet assembly and the linear housing 30 are connected over a sliding surface interface 39. It is this interface that comprises a ferrofluid according to a preferred embodiment of the present invention.

According to one embodiment of the present invention, the ferrofluid comprises magnetized or magnetizable nano particles that are dispersed in a carrier fluid. Such ferrofluids hence show magnetic properties despite of the fact that the ferrofluid is a fluid.

Upon positioning a ferrofluid within a magnetic field the fluid, experiences a force and travels in the direction of the magnetic field lines. Such a movement along the magnetic field lines results in a collection of ferrofluid at positions where the density of magnetic field lines is high, that is where the magnetic field strength is high. As magnetic particles experience a force along the field lines, the particles are not moved across the magnetic field lines. If a surface for this reason is crossed by magnetic field lines, a ferrofluid containing particles that are magnetic, experiences an attraction force from this surface, or rather the magnetic field crossing the surface.

In principle, a repulsion force could be experienced, but since the repulsion force alternative is energetically non-favourable over the attraction alternative, the magnetic particles experience an attraction force.

Due to this attraction force the magnetic ferrofluid is collected on the surface. Since the ferrofluid travels along the magnetic field lines, an orientation of the magnetic field lines and the surface for which the magnetic field lines are parallel with the normal to the surface, that is perpendicular to the plane of the surface, is beneficial for maintaining the ferrofluid on the surface.

In case the normal of the surface would be perpendicular to the magnetic field lines, the ferrofluid would not remain on the surface, but rather be attracted away in the direction of the field lines. This would hence result in a surface without comprising any ferrofluid.

In practise, orientations for which the angle between the normal to the surface and the magnetic field lines, is less than about n/4 rad (that is 45 degrees), lend the magnetic particles of the ferrofluid the attraction force, which makes the ferrofluid remain on the surface.

Returning to FIG. 3, a few magnetic field lines 38 are schematically indicated. At the sliding surface interface 39 between the magnet assembly and the housing 30, the magnetic field line is approximately parallel with the normal to the surface of the interface 39. This will thus be beneficial since the ferrofluid will remain on the surface and not travel away from the surface.

According to one embodiment of the present invention, when applying a ferrofluid comprising magnetized particles on the interface surface between the housing and the magnet assembly, the friction between said housing surface and the magnet assembly is very low, due to the properties of the ferrofluid when subjected to magnetic field lines crossing the surface interface.

A very low friction in the interface between the magnet assembly and the housing means that the magnet assembly can move back and/or fourth along the housing with very little losses upon application of an electric field over the connectors 14, 24 of the coiling, as depicted in FIGS. 1 and 2, respectively.

According to one embodiment of the present invention, a very efficient electromagnetic vibrator is thus achieved.

For a linear vibrator the magnet assembly including the magnet is intended to move back and forth within the housing and inside the coiling. In order to move the magnet in one direction one polarity of the electric voltage, that is applied to the coiling, is required, and in order to move the magnet in the opposite direction the reverse polarity of the electric voltage is needed. If an alternating current electric voltage is applied to the coiling the magnet assembly would thus move back and forth in one dimension as determined by the track or the housing, that is back in one direction and forth in the opposite direction. As such an electric voltage is applied the magnet assembly can be made to move back and forth without the assistance by any further elements or effects.

When an electromagnetic vibrator according to the present invention, is not in use, the magnet assembly would still experience a very low friction against the housing surface, which could make the magnet assembly to hit the top end or bottom end of the housing or tubular cavity, since the magnetic field from the magnet remains unchanged. Such a behaviour is disadvantageous since it would create mechanical damage to the electromagnetic vibrator, at the same time as it could create an unpleasant tactile experience for a user of a portable communication device comprising the electromagnetic vibrator. In addition, hitting a top end and/or bottom end would cause an un-desired noise.

As the motion direction of the magnet assembly is dependent on the polarity of the applied electrical voltage, an applied polarity causing the magnet assembly to move away from the center of the coiling, is un-wanted in case the magnet assembly already is positioned near or at either one of the top end or bottom end of the housing. If such an electric voltage is applied to the coiling when the magnet assembly is positioned near or at the end of the housing, the magnet assembly could again hit the bottom end or top end of the housing, creating the problems as described in the paragraphs above.

In order to avoid hitting the top or bottom end of the housing by the magnet assembly, one or two centering elements are introduced in the housing, for centering the magnet assembly in the axial direction of the housing.

By referring to FIGS. 4-7, schematically showing housing-magnet arrangements, different embodiments of the present invention are explained, by focusing on the centering elements comprised in the respective housing.

Figure 4:
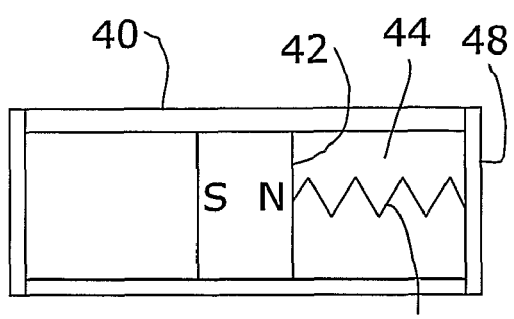

FIG. 4 discloses one embodiment in which the electromagnetic vibrator comprises a housing 40, a magnet 42, a right hand side end stop 48 and a compartment 44 that is formed between the magnet 42 and the right hand side end stop 48. On the left side of the magnet 42 in the interior of the housing a second compartment is also formed between the magnet and a left hand side end stop, (not denoted in FIG. 4).

In the compartment 44 on the right side of the magnet 42, a centering element 46 is schematically shown. According to this embodiment of the present invention, the centering element is a spring, of which one end is attached to the magnet and of which the other end is attached to the interior side of the right hand side end stop 48. The spring, being one example of a centering element, has the function of centering the magnet within the housing to a position essentially in the center of the housing in the axial dimension.

The spring 46 has the advantage that it allows the back- and forth motion of the magnet or magnet assembly, since the spring according to this embodiment allows both an elongation upon pulling of the magnet, and a compression upon pushing of the magnet.

According to one embodiment of the present invention there is no requirement for the spring 46 to support the magnet 42 or magnet assembly in a transverse or radial dimension of the housing/vibrator. The reason for this is that there is mechanical sliding contact in the interface 39 between the surface of the magnet assembly and the surface side of the housing 30. The magnet assembly is guided by the track which in FIG. 3 is shown as an interior cavity.

A non-linear spring can be characterized by having a force function, rather than a force constant, as the ratio of an applied longitudinal force and the change in length of the spring. The usage of a non-linear spring allows a greater amplitude of the moving magnet in the axial dimension for a constant loss, maintaining the centering element functionality.

According to one embodiment of the present invention, the centering element is a non-linear spring.

Figure 5:
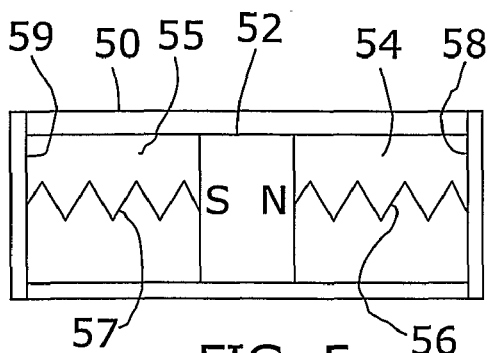

FIG. 5 schematically shows another embodiment of the present invention, an electromagnetic vibrator comprising two centering elements 56, 57 wherein a first centering element 56 is positioned in a first compartment 54 and a second centering element 57 is positioned in a second compartment 55.

According to one embodiment, the left side of the first spring 56 is attached to the right side of the magnet 52 or magnet assembly, and the right side of the spring 56 is attached to the left side of the right side end stop 58 of the housing 50 or the entire electromagnetic vibrator. Similarly the left side of the second spring 57 is attached to the right side of left side end stop 59, and the right side of the spring 57 is attached to the left side of the magnet 52 or magnet assembly.

Analoguous to another embodiment that was described above, there is no requirement of the first and second springs 56, 57 to support the magnet in a transverse dimension, perpendicular to the axial dimension of the housing.

In addition, the first and second springs 56,57 may be designed to show a non-linear force function behaviour. This may for example be realized by using a non-constant pitch of the springs 56,57.

Figure 6:
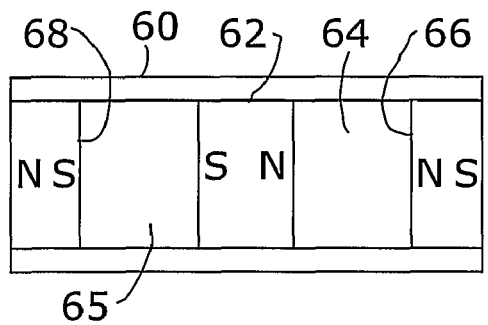

In FIG. 6 an electromagnetic vibrator according to another embodiment of the present invention is presented. Within this embodiment the centering elements each comprise a centering magnet 66,68 that is oriented to exert a repelling force on the moving magnet 62. On the right side the right compartment 64 is defined as the volume within the right side of the moving magnet 62 or magnet assembly, the housing 60, and the left side of the left centering magnet 66. The left compartment 65 is similarly defined as the volume comprised within the left side of the moving magnet 62, the housing 60 and the right side of the centering magnet 68. The right and left centering magnets are thus examples of right and left end stops of the housing 60.

Due to the repelling forces between the moving magnet 62 and the centerings magnets 66, 68, the moving magnet is hindered from hitting either one of the left or right end stops, which in this embodiment are comprised by the centerings elements of the electromagnetic vibrator.

The moving magnet 62 or magnet assembly within the above described embodiments in FIGS. 4, 5 and 6, may be designed with axial channels penetrating through the moving magnet and or the support structure, comprised in the magnet assembly, to allow a gas, for example air, to flow between the two compartments, minimizing the influence of the enclosed gas in the compartments on the motion of the magnet.

Figure 7:
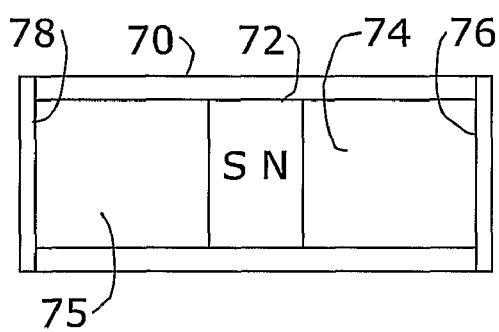

FIG. 7, shows yet another embodiment of the electromagnetic vibrator according to the present invention, comprising a housing 70 and a right end stop 76 and a left end stop 78 of the housing. According to this embodiment the housing and the right and left end stops are tightly fitted together forming a gas tight enclosure. In addition the magnet 72 or magnet assembly is also tightly fitted against the housing 70. The tight seal between the magnet assembly and the housing is realized by ferrofluid being applied in the interface between the magnet assembly and the housing (see FIG. 3 wherein the interface is denoted with 39). Within this embodiment of the present invention, the left and right compartments are thus essentially gas tight.

Since gases are compressible, the gas tight compartments filled with a gas receive a spring function, exerting a pushing force on the moving magnet assembly when being compressed, and a pulling force when being decompressed. By changing the gas pressure of the two compartments the forces exerted on the magnet assembly can easily be adjusted.

The centering elements in this embodiment are thus essentially gas tight compressible and decompressible compartments, having the beneficial property of comprising a limited number of parts.

Figure 8:
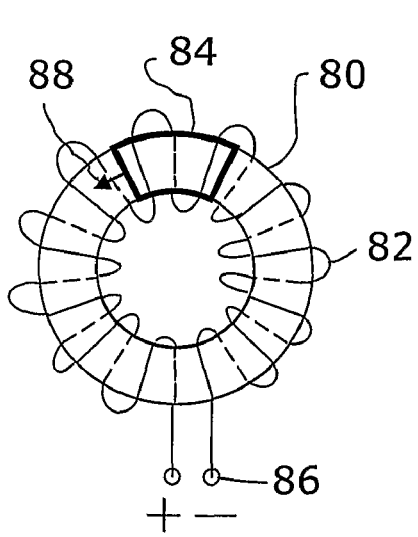

According to an alternative embodiment of the present invention the tubular cavity onto which the moving magnet is tightly fitted comprises a toroid 80, as schematically shown in FIG. 8. By winding a coiling 82 around the toroid 80 and applying a DC-electrical voltage over the connectors 86 of the coiling 82, a magnet 84 within the tubular cavity, here the toroid, 80, experiences a uni-directed force 88 moving the magnet in one circular dimension around the toroid.

In this embodiment, as in the other embodiments as presented above, it is beneficial to position the moving magnet within a supporting structure 34, 36 as shown in FIG. 3, in order to orient the magnetic field lines with a substantial component directed parallel with the normal of the sliding surface in the interface between the magnet assembly and the housing.

As the ferrofluid preferably is applied in the sliding surface interface between the magnet assembly and the housing for all the embodiments, the electromagnetic device according to the present invention is given a high efficiency with only very minor losses when being used.

In addition, as the ferrofluid provides a very low friction within the orientation as described above, starting an electromagnetic vibrator by applying an electric voltage over connectors connected to the coiling, is performed within a short time, that is the response time from an applied electric voltage until experienced vibrations is very short.

Due to the design of the electromagnetic vibrators according to the various embodiments as described above, the interior of the vibrator is efficiently protected by the surrounding housing, such that damage on the moving parts due to outside influences is minimized.

Figure 9:
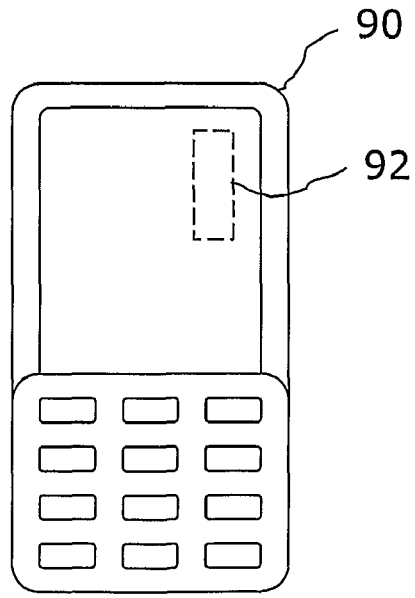

FIG. 9 presents a portable communication device, comprising an electromagnetic vibrator according to one embodiment of the present invention. In this figure the portable communication device is designed as a mobile phone 90 comprising the electromagnetic vibrator 92. This is only one example of a portable communication device, which may comprise any type of portable computer such as a personal digital assistant, etc.

It is emphasized that this invention can be varied in many ways, of which the alternative embodiments above only are examples of a few. These different embodiments are hence non-limiting examples. The scope of the present invention, however, is only limited by the subsequently following claims.

The described present invention thus carries the following advantages:

The present invention comprises the advantage that the electromagnetic vibrator is more efficient due to the application of a ferrofluid mixture subjected to a magnetic field. In addition, the electromagnetic vibrator also achieves a shorter response time as the friction between the magnet assembly and the housing or track, is minimized. The electromagnetic vibrator does moreover not comprise any mechanical parts that can be damaged from outside influences. The low number of mechanical parts, dependent of the embodiment, renders the electromagnetic vibrator being manufacturable at a low cost.

The present invention brings the advantage that the power consumption for the electromagnetic vibrator is very low.

The low friction is in addition beneficial for the lifetime of the electromagnetic vibrator.

The invention claimed is:

1. A portable communication device, comprising:
an electromagnetic vibrator to provide tactile stimuli to a user of the portable communication device, the electromagnetic vibrator including:
a housing having a long axis and comprising a track, directed in a first dimension, formed at an inner surface and along the long axis of the housing,
a coiling comprising at least one coil turn, oriented in a second dimension essentially perpendicular to the first dimension, coiled around an outer surface of the housing, to receive an electric voltage and form a magnetic field,
a permanent magnet assembly to move, guided by a rail associated with the track on or around which said permanent magnet assembly is tightly fitted, responsive to the magnetic field, and
a ferrofluid mixture, applied to a sliding surface interface between the track and the permanent magnet assembly, allowing the movement of the permanent magnet assembly in the first dimension in dependence of the electric voltage as supplied to the coiling, to produce the tactile stimuli; and
a power source to supply the electric voltage to the coiling.

2. The portable communication device according to claim 1, where the ferrofluid is a low friction ferrofluid mixture comprising:
magnetic or magnetizable nano particles, and
a carrier fluid, in which the magnetic or magnetizable nano particles are dispersed.

3. The portable communication device according to claim 2, where the nano particles comprise ferrite particles and the carrier fluid comprises an organic carrier fluid.

4. The portable communication device according to claim 1, where the track comprises a tubular cavity directed in the first dimension and in which tubular cavity the permanent magnet assembly is to move.

5. The previously presented portable communication device according to claim 4, where the tubular cavity has a circular cross section.

6. The portable communication device according to claim 4, where the tubular cavity is linear in shape.

7. The portable communication device according claim 4, where the tubular cavity has a toroidal shape.

8. The portable communication device according to claim 7, where the coiling is to receive a direct current electric voltage.

9. The portable communication device according to claim 1, further comprising:
at least a first centering element located within the housing and on a first side of the permanent magnet assembly, along the first dimension, for exerting an alternating attracting and repelling force directed in the first dimension on the permanent magnet assembly.

10. The portable communication device according to claim 9, further comprising:
a second centering element located on a second side of the permanent magnet assembly along the first dimension, for exerting a centering force directed in the first dimension on the permanent magnet assembly.

11. The portable communication device according to claim 10, where the first and second centering elements comprise a first and a second spring, respectively, attached on either side of the permanent magnet assembly, for exerting centering forces directed in the first dimension on the permanent magnet assembly.

12. The portable communication device according to claim 10, where the first and second centering elements comprise a second and a third permanent magnet, respectively, oriented in opposite direction in relation to one another in the first dimension, for exerting centering forces directed in the first dimension on the permanent magnet assembly.

13. The portable communication device according to claim 10, where the first and second centering elements each comprise an essentially gas tight compartment and where there is an essentially gas tight fit at the contact surface between the permanent magnet assembly and a surface wall of the track.

14. The portable communication device according to claim 9, where the first centering element comprises a first spring of which a first end is attached to a first end of the permanent magnet assembly, and of which a second end is attached to an inner side of a first end stop of the track.

15. The portable communication device according to claim 14, where the first and second springs are non-linear in the first dimension.

16. The portable communication device according to claim 1, where the coiling is to receive an alternating current electric voltage.

17. A mobile phone comprising:

an electromagnetic vibrator to provide tactile stimuli to a user of the mobile phone, the electromagnetic vibrator including:

a housing comprising a track, directed in a first dimension, formed as a protrusion on or a recess in an inner surface and along a long axis of the housing, a coiling comprising at least one coil turn, oriented in a second dimension essentially perpendicular to the first dimension, around the housing, to receive an electric voltage and form a magnetic field, a permanent magnet assembly to move, guided by a rail associated with the track, responsive to the magnetic field, and a ferrofluid mixture, applied to a sliding surface interface between the track and the permanent magnet assembly, allowing the movement of the permanent magnet assembly in the first dimension in dependence of the electric voltage as supplied to the coiling, to produce the tactile stimuli; and a power source to supply the electric voltage to the coiling.

* * * * *